(12) United States Patent
Kohara

(10) Patent No.: US 10,771,642 B2
(45) Date of Patent: Sep. 8, 2020

(54) CONTROL PANEL AND IMAGE FORMING APPARATUS

(71) Applicant: Tasuku Kohara, Kanagawa (JP)

(72) Inventor: Tasuku Kohara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/257,234

(22) Filed: Jan. 25, 2019

(65) Prior Publication Data

US 2019/0306345 A1    Oct. 3, 2019

(30) Foreign Application Priority Data

Mar. 30, 2018 (JP) ................ 2018-068974

(51) Int. Cl.
| | | |
|---|---|---|
| *H04N 1/00* | (2006.01) | |
| *G06F 3/041* | (2006.01) | |
| *G03G 15/00* | (2006.01) | |
| *G06F 3/044* | (2006.01) | |

(52) U.S. Cl.
CPC ..... *H04N 1/00496* (2013.01); *G03G 15/5016* (2013.01); *G06F 3/0412* (2013.01); *H04N 1/00411* (2013.01); *G06F 3/044* (2013.01); *G06F 3/0414* (2013.01); *G06F 2203/04108* (2013.01)

(58) Field of Classification Search
CPC . G06F 3/0484; G06F 3/0412; G03G 15/5016; H04N 1/00411; H04N 1/00496
See application file for complete search history.

(56) References Cited

U.S. PATENT DOCUMENTS

| | | | | |
|---|---|---|---|---|
| 2009/0066644 | A1* | 3/2009 | Endoh | G03G 15/502 345/157 |
| 2014/0302893 | A1* | 10/2014 | Dhavaloganathan | H04M 1/72577 455/566 |
| 2017/0163829 | A1* | 6/2017 | Fujioka | H04N 1/00891 |
| 2017/0255272 | A1* | 9/2017 | Flagg | G06F 3/017 |

FOREIGN PATENT DOCUMENTS

| | | |
|---|---|---|
| JP | 2007-067966 | 3/2007 |
| JP | 2009-086612 | 4/2009 |
| JP | 2012-168618 | 9/2012 |
| JP | 2013-191109 | 9/2013 |
| JP | 2016-051918 | 4/2016 |

* cited by examiner

*Primary Examiner* — Abbas I Abdulselam
(74) *Attorney, Agent, or Firm* — Harness, Dickey & Pierce P.L.C.

(57) ABSTRACT

An image formation apparatus includes: a control panel to receive an input of an operator; a main device to execute an operation instruction corresponding to the input; and a tilt changing section to change a tilt of the control panel relative to the main device. The control panel includes a touch panel having a touch surface to be touched, a control panel housing covering the touch panel, a proximity sensor to sense an object in the proximity of the control panel, and circuitry that: determines a presence or an absence of an operation of the tilt changing section by the operator based on a result of the sensing by the proximity sensor; outputs an operation instruction to the main device based on a touch input on the touch surface; and refrains from outputting the operation instruction based on a determination that the tilt is changed.

20 Claims, 17 Drawing Sheets

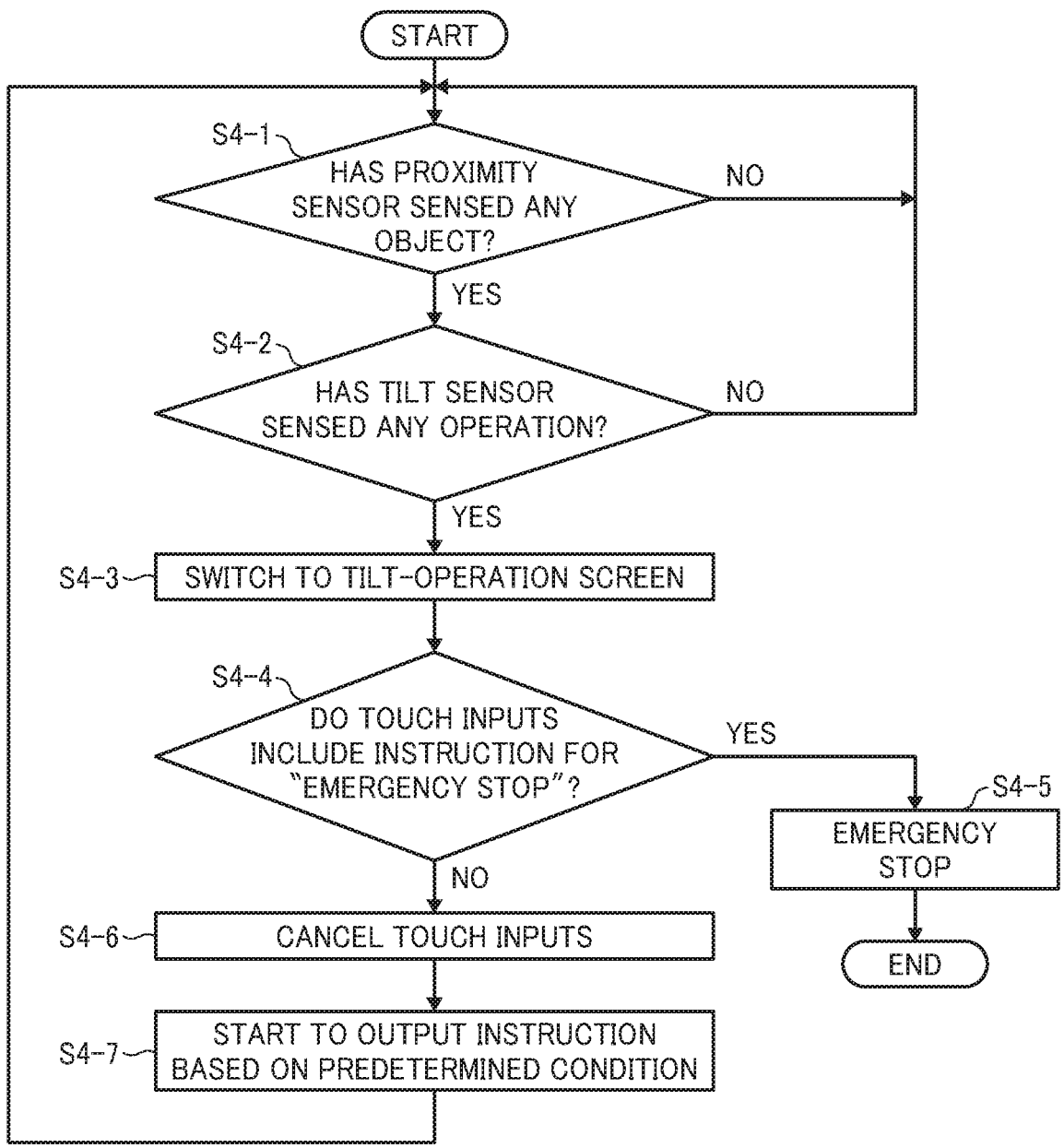

CONTROL PANEL AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2018-068974, filed on Mar. 30, 2018, in the Japan Patent Office, the entire disclosure of which is hereby incorporated by reference herein.

BACKGROUND

Technical Field

The present invention relates to a control panel and an image forming apparatus.

Description of the Related Art

In the related art, in a control panel that is an input apparatus of an information processing apparatus, a touch panel is arranged on a liquid crystal display (LCD) screen. Soft keys are arranged on the LCD screen, and a pressed position on the touch panel is sensed.

A display section of such a control panel may be sometimes hard to see by a reflection of light such as outdoor light or a fluorescent lamp at the location where the information processing apparatus is installed (installed location). However, among information processing apparatuses, in particular, a relatively large apparatus such as an image forming apparatus is difficult to move from the installed location to a location with no reflection of light. In addition, the image forming apparatus is often used in the same office by various operators such as a user of a wheelchair, a short person, and a tall person, and thus, the control panel may be hard to see or operate depending on the person.

For such a situation, a tilt mechanism has been known. The tilt mechanism is provided between a main device of the information processing apparatus such as the image forming apparatus and the control panel thereof. An operator holds the control panel to change a tilt of the control panel relative to the main device so as to set an optimal angle for the operator, preventing a reflection of a fluorescent lamp.

In a case of the above-described touch panel, however, as a result of an erroneous pressing on a soft key when changing the tilt of the control panel that is held, an erroneous operation may be performed on the information processing apparatus such as the image forming apparatus.

Japanese Unexamined Patent Application Publication No. 2012-168618 describes a technique that prevents an unintended input as a result of an erroneous touch on a touch panel of an electronic device having two touch panel screens. The electronic device has movement sensing sensor for the respective screens, and upon sensing of a relative movement between the display screens by the movement sensing sensor, the input to the touch panel is invalidated.

In addition, Japanese Patent No. 5641003 describes a technique that prevents an erroneous operation by changing a touch detection region upon detection of an operator's hand in the proximity of a frame portion of a touch panel.

The above patent literatures, however, do not include description about a tilt changing operation in which, out of the main device and the control panel, an operator moves the control panel so as to change the tilt relative to the main device. Thus, it is not possible to prevent an erroneous operation caused by the tilt changing operation.

SUMMARY

Example embodiments include an image formation apparatus including: a control panel to receive an input of an operator; a main device to execute an operation instruction corresponding to the input; and a tilt changing section to change a tilt of the control panel relative to the main device in response to a movement of the control panel by the operator holding at least a part of the control panel. The control panel includes a touch panel having a touch surface that is to be touched for the input, a control panel housing covering the touch panel except for at least a part of the touch surface, a proximity sensor to sense an object in the proximity of the control panel, and circuitry. The circuitry determines a presence or an absence of an operation of the tilt changing section by the operator based on a result of the sensing of the proximity sensor, outputs an operation instruction to the main device based on a touch input that is the input given by a touch on the touch surface, and refrains from outputting the operation instruction based on a determination that the tilt is changed.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 19 is a flowchart illustrating a third example of the erroneous operation preventing process according to the second embodiment.

Figure 1:
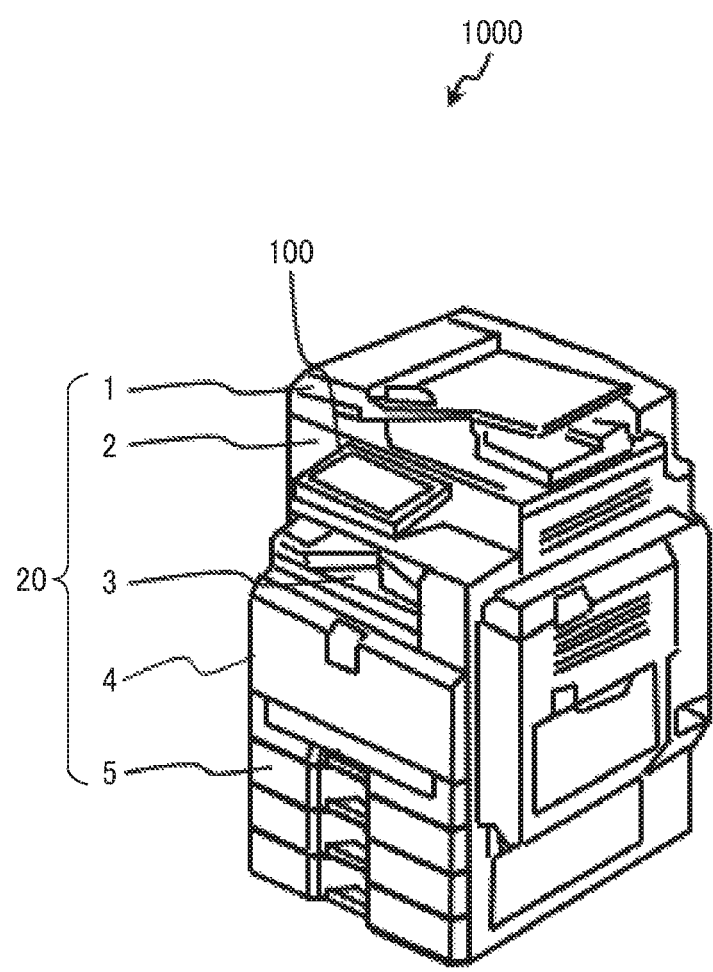
FIG. 1 is a perspective view of an external appearance of an image forming apparatus according to one or more embodiments.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Now, embodiments of the present invention will be described below with reference to the attached drawings. Note that constituent elements such as members or components having the same function or shape in the drawings for describing the embodiments of the present invention are denoted by the same reference numeral as long as discrimination is possible and will be described once to omit redundant description.

FIG. 1 is a perspective view of an external appearance of an image forming apparatus 1000. The image forming apparatus 1000 includes an auto document feeder (ADF) 1, a scanner 2, a sheet ejection section 3, a housing 4, a sheet tray 5, and a control panel 100.

The ADF 1 is located in an upper portion of the image forming apparatus 1000 and automatically feeds a document that has been set by an operator to the scanner 2. The scanner 2 optically reads the document and generates image data. The generated image data is printed on a sheet accommodated in the sheet tray 5, and the sheet is ejected to the sheet ejection section 3. The housing 4 is the entire exterior of all components of the image forming apparatus 1000 except for the control panel 100.

The control panel 100 is a panel used by the operator to input an instruction to the image forming apparatus 1000.

Hereinafter, the image forming apparatus 1000 may be described with the control panel 100 and the other components separated from each other. In such a case, the components other than the control panel 100, which include, for example, the ADF 1, the scanner 2, the sheet ejection section 3, the housing 4, the sheet tray 5, and the like, will be referred to as main device components. Some main device components are combined together to be referred to as a main device 20.

Figure 2:
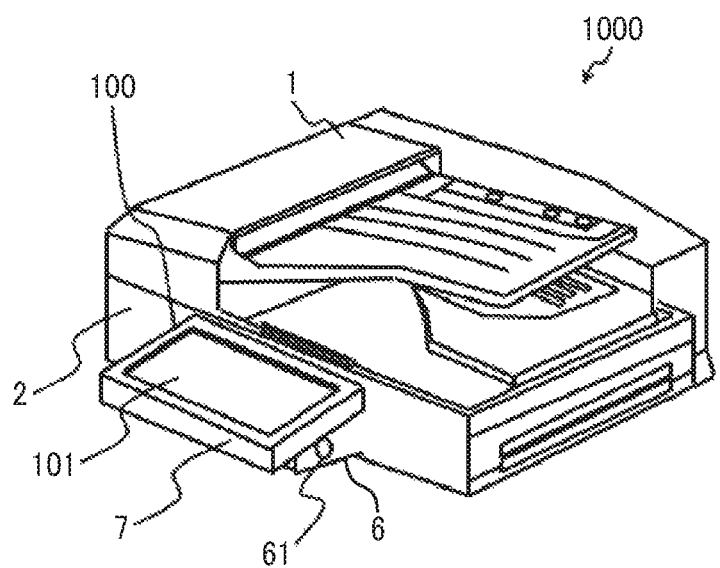
FIG. 2 is a perspective view of an external appearance of a control panel and its periphery according to one or more embodiments.

FIG. 2 is a perspective view of an external appearance of the control panel and its periphery. The control panel 100 includes a touch panel 101 and an exterior 7 of the control panel.

The touch panel 101 is a touch sensor of a capacitive type or a pressure-sensitive type, the type of which may be selected as appropriate in accordance with its usage or the like. For example, in a capacitive touch panel, a sensor pattern for sensing a touch can be relatively thin, and glass or a film can be further pasted onto a printed sensor pattern, and thus, the control panel 100 can be manufactured as a flat and well-designed panel.

By touching a touch surface of the touch panel 101, where a touch is sensed, the operator inputs an instruction to the image forming apparatus 1000. Such an input given by a touch may be hereinafter referred to as a touch input.

The exterior 7, which is a housing of the control panel, is configured not to cover the touch surface of the touch panel 101 facing the operator.

As illustrated in FIG. 2, the image forming apparatus 1000 includes a tilt changing section 6 between the control panel 100 and a part of the main device 20, which is, for example, the scanner 2. The tilt changing section 6 includes a shaft section 61 that extends in parallel to the touch surface of the touch panel 101. An end of the shaft section 61 is seen in FIG. 2. The shaft section 61 rotates along with the control panel 100, functioning as a rotation axis of the control panel 100.

Figure 3:
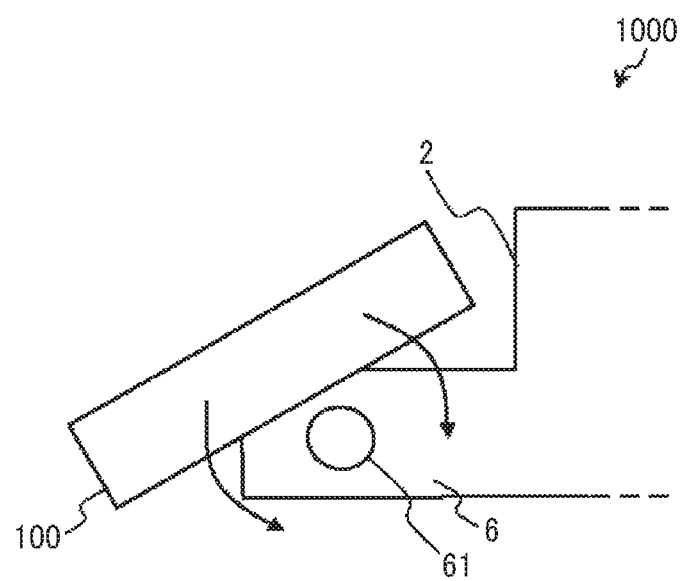
FIG. 3 illustrates a movement of the tilt changing section according to one or more embodiments.

FIG. 3 illustrates a movement of the tilt changing section. The operator can hold a part of the control panel 100 and move the control panel 100 so as to perform user operations more easily. Specifically, the operator can rotate the control panel 100 around the axis of the shaft section 61 as illustrated by the arrows in FIG. 3. Along with the rotation, the tilt of the control panel 100 relative to the main device 20 is changed.

Figure 4A:
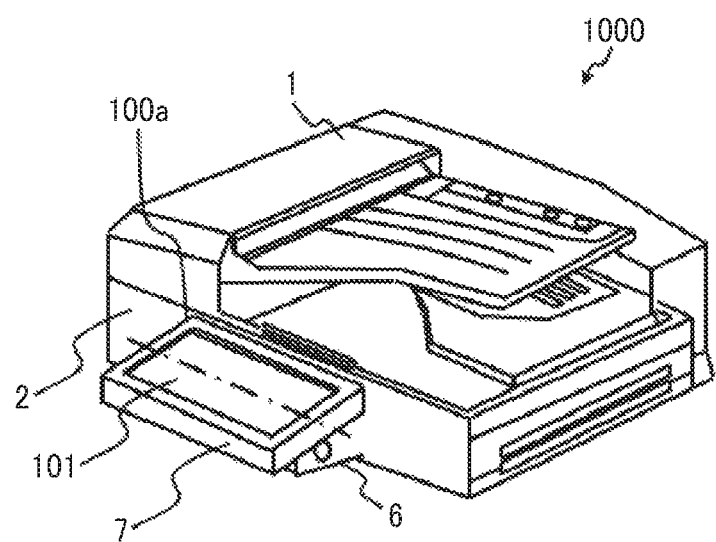
FIGS. 4A and 4B are perspective views of external appearances of control panels of different types according to one or more embodiments.
Figure 4B:
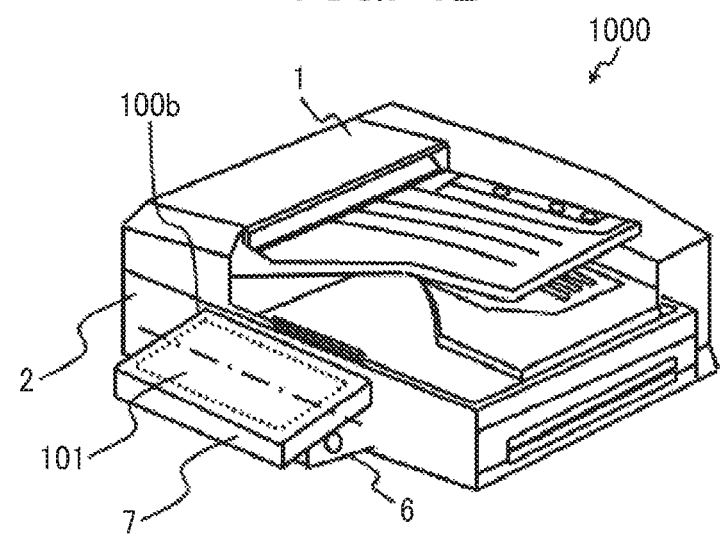

FIGS. 4A and 4B are perspective views of external appearances of control panels of different types. FIG. 4A corresponds to a configuration where a step is provided at the boundary between the exterior 7 and the touch panel 101, whereas FIG. 4B corresponds to a configuration where no step is provided at the boundary between the exterior 7 and the touch panel 101. Details will be described with reference to FIGS. 5A and 5B, which are sectional views taken along chain lines in FIGS. 4A and 4B.

Figure 5A:
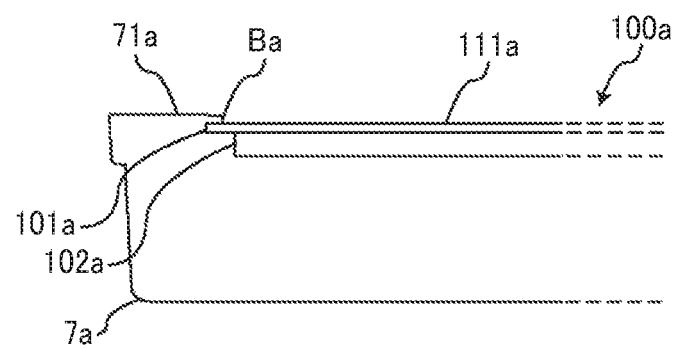
FIGS. 5A and 5B are sectional views of the control panels according to one or more embodiments.
Figure 5B:
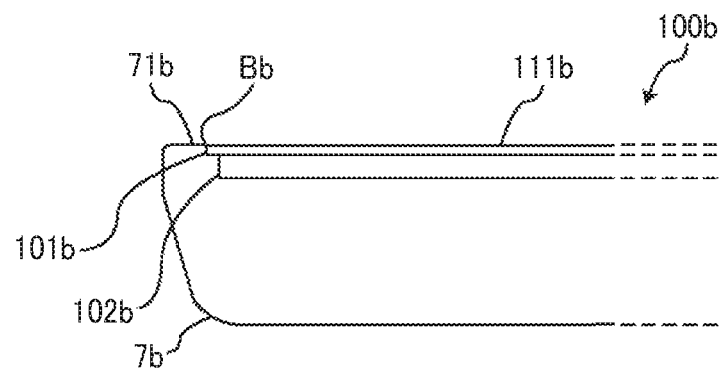

FIGS. 5A and 5B are sectional views of the control panels taken along chain lines in FIGS. 4A and 4B, illustrating an end portion of the control panel 100 to a substantially center portion thereof. Components that are common to FIGS. 5A and 5B will be denoted by reference numerals omitting scripts "a" and "b", which indicate FIGS. 5A and 5B, respectively.

The control panel 100 includes the above-described touch panel 101, an LCD 102 that is a display section, and the exterior 7.

As described above, the touch panel 101 includes the touch surface, which is a touch surface 1011. The touch surface 1011 faces the operator. Hereinafter, the side on which the touch surface 1011 is provided may be referred to as a front surface of the control panel 100.

The LCD 102 serving as a display section is provided so as to face away from the touch surface 1011 of the touch panel 101. The LCD 102 displays information for user operations through the touch panel 101 between the LCD 102 and the operator. Although the LCD is used as an example of the display section, it is also possible to use another display such as an organic electroluminescent (EL) display and any other display.

The exterior 7 of the control panel illustrated in each of FIGS. 5A and 5B is an outer circumference for easy understanding. The exterior 7 of the control panel is a housing covering the touch panel 101 except for at least a part of the touch surface 1011. The touch surface 1011 is not covered with the exterior 7 of the control panel for the operator to make touch inputs. A part of the exterior 7 of the control panel surrounding the periphery of the touch surface 1011 as viewed from the operator is referred to as a touch-surface surrounding part 71. The touch-surface surrounding part 71 illustrated in each of FIGS. 5A and 5B is on a plane that is substantially parallel to the touch surface 1011. Next, FIGS. 5A and 5B will separately be described.

First, in FIG. 5A, there is a step at a boundary Ba between the touch-surface surrounding part 71a and the touch surface 1011a. The touch surface 1011a is lower than the touch-surface surrounding part 71a in FIG. 5A. In other words, there is unevenness: the touch-surface surrounding part 71a is a protrusion, the touch surface 1011a is a recess, and the boundary therebetween is the boundary Ba. In addition, the boundary Ba may be referred to as a boundary between the exterior 7 and the touch panel 101.

The configuration in FIG. 5A is often employed for a pressure-sensitive touch panel using a resistive film or the like. In a case of the pressure-sensitive touch panel, the sensor pattern around the touch panel is relatively large. Thus, in order to hide the sensor pattern so as not to be seen, the touch-surface surrounding part 71a may have a somewhat large size. The control panel 100a can be manufactured at a relatively low cost.

On the other hand, in FIG. 5B, no step is provided, that is, flatness is maintained, at a boundary Bb between the touch-surface surrounding part 71b and the touch surface 1011b. In other words, the touch-surface surrounding part 71b and the touch surface 1011b are on substantially the same plane. In addition, the boundary Bb may be referred to as a boundary between the exterior 7 and the touch panel 101. Note that the touch-surface surrounding part 71b on a plane that is substantially the same as the touch surface 1011b may be referred to as a first surface to be distinguished from the other surfaces.

Figure 6A:
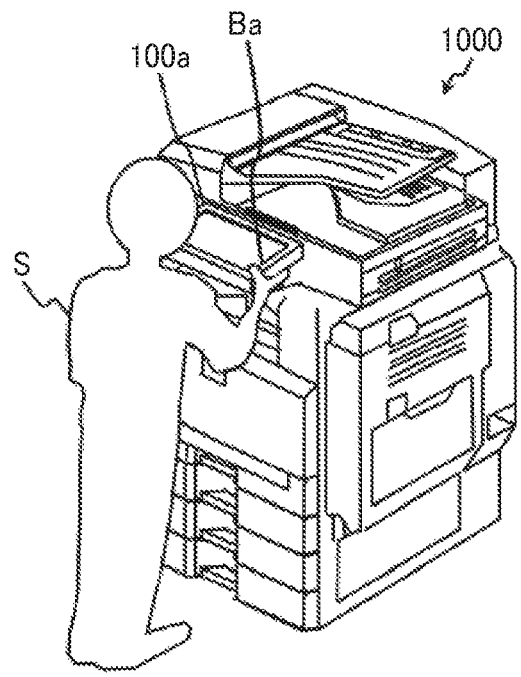
FIGS. 6A and 6B are each a perspective view of an operator and the external appearance of the image forming apparatus according to one or more embodiments.
Figure 6B:
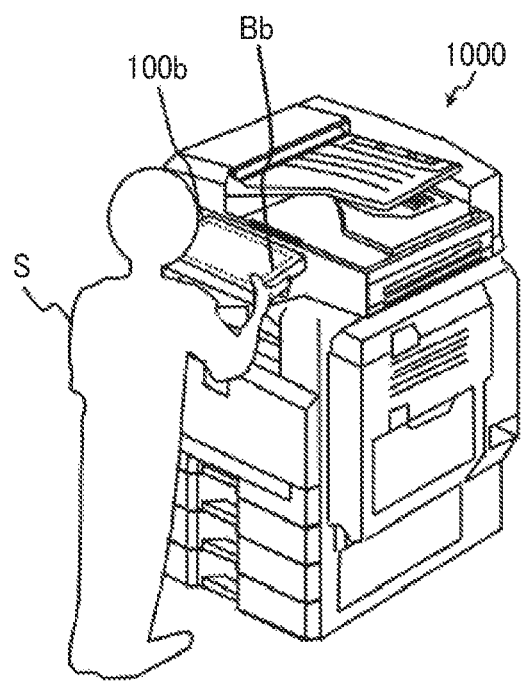

FIGS. 6A and 6B are each a perspective view of an operator S and the external appearance of the image forming apparatus 1000, illustrating a situation in which the operator S holds a part of the control panel 100 to move the control panel 100.

FIG. 6A illustrates a case of the control panel 100a illustrated in FIG. 5A. As illustrated in FIG. 5A, there is a step at the boundary Ba between the touch-surface surrounding part 71a and the touch surface 1011a. Accordingly, when the operator S holds a periphery of the control panel 100a to tilt the control panel 100a, even if the operator S presses the touch panel, since there is a step, that is, unevenness, the operator S is likely to recognize, by the texture, that he/she has made or is about to make the erroneous touch on the touch surface 1011a.

On the other hand, FIG. 6B illustrates a case of the control panel 100b illustrated in FIG. 5B. As illustrated in FIG. 5B, flatness is maintained at the boundary Bb between the touch-surface surrounding part 71b and the touch surface 1011b. In FIG. 6B, a dotted line illustrates the boundary Bb, so that a region inside the dotted line is the touch surface 1011b. The control panel 100b, which has such a generally flat surface without unevenness on a surface facing the operator S, is a configuration by which the operator S is unlikely to recognize that he/she has made or is about to make the erroneous touch on the touch surface 1011b.

Next, a hardware configuration of the image forming apparatus 1000 according to a first embodiment will be described with reference to FIG. 7.

The image forming apparatus 1000 according to this embodiment is a so-called multifunction peripheral/product/printer (MFP) having multi functions such as a copier function, a fax function, a printer function, a scanner function, and a function of storing or distributing data of an input image (image read by using the scanner function or image input by using the printer or fax function). Note that various types of image data to be processed by the image forming apparatus 1000 in this embodiment include data of text information alone without images.

Figure 7:
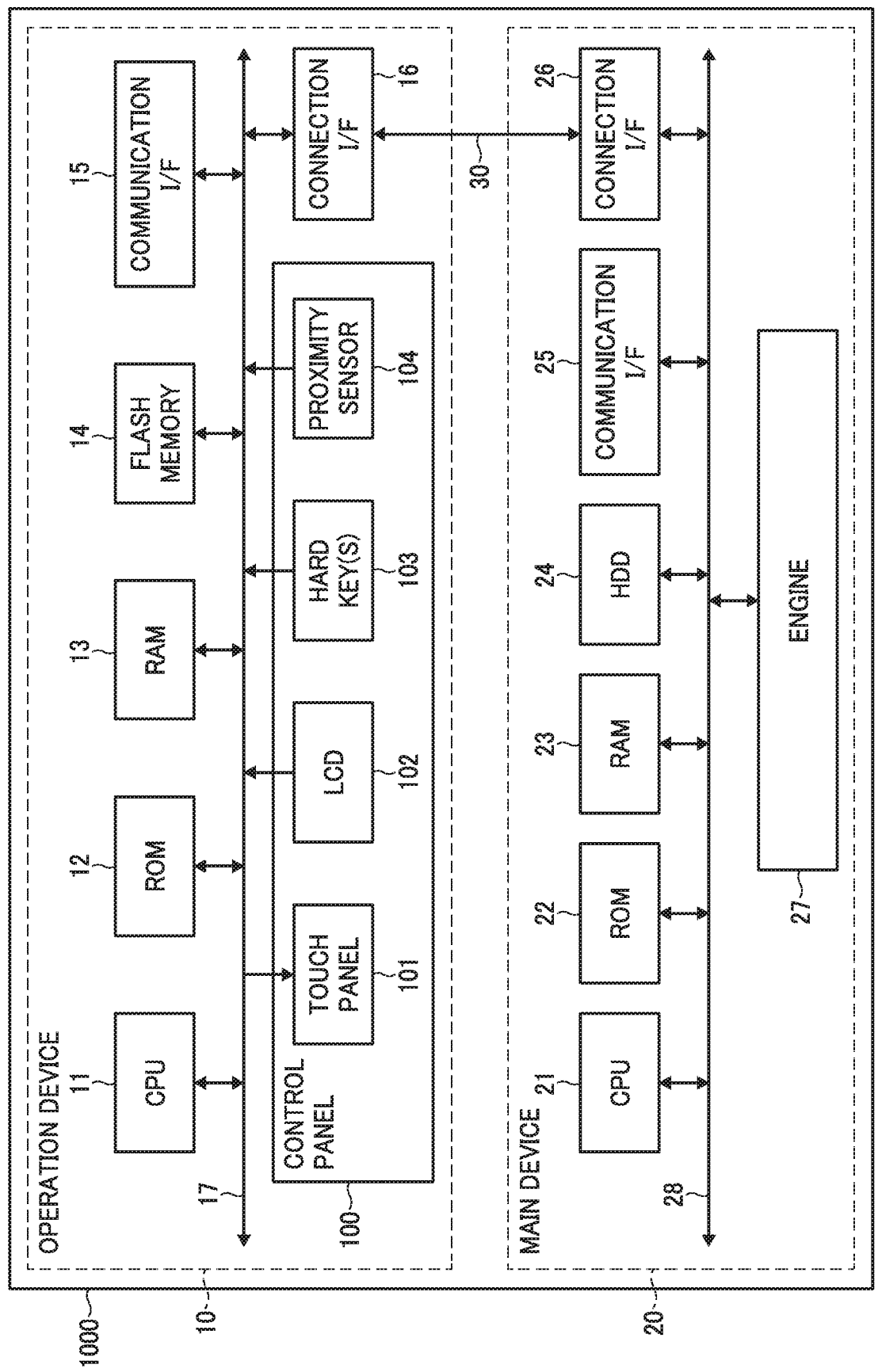
FIG. 7 illustrates a hardware configuration of the image forming apparatus according to a first embodiment.

As illustrated in FIG. 7, the image forming apparatus 1000 includes an operation device 10 that receives an instruction given by a user operation and the main device 20 that works to implement various functions such as the copier function, the fax function, and the scanner function in response to an instruction from the operation device 10. In other words, the main device 20 can work in accordance with the user operation received by the operation device 10. Note that the reception of the user operation is a concept including reception of information that is input in accordance with the user operation.

The operation device 10 and the main device 20 are connected to each other such that mutual communication through a dedicated channel 30 is possible. The channel 30 may conform to the universal serial bus (USB) standard, for example, or any other standard regardless of wired or wireless communication.

The operation device 10 and the main device 20 can communicate with an external apparatus such as a personal computer (PC) by using a communication interface (I/F) 15 and a communication I/F 25 and can work in accordance with an instruction received from the external apparatus. In addition, the operation device 10 and the main device 20 may be connected to each other via, not only the dedicated channel 30, but also a network using the communication I/F 15 and the communication I/F 25.

The hardware configuration of the operation device 10 will be further described. As illustrated in FIG. 7, the operation device 10 includes a central processing unit (CPU) 11, a read only memory (ROM) 12, a random access memory (RAM) 13, a flash memory 14, the communication I/F 15, a connection I/F 16, and the control panel 100, which are connected to one another via a system bus 17. Note that the operation device 10 may further include an external connection I/F to be connected to an authentication card reader or the like.

The CPU 11 generally controls the operation of the operation device 10. The CPU 11 executes a program stored in the ROM 12 or the flash memory 14 by using the RAM 13 as a work area, and thereby controls the entire operation of the operation device 10 and implements various functions including display of information (image) in accordance with the operator's input that has been received.

The communication I/F 15 is an interface for connecting to a network such as the Internet or a local area network (LAN).

The connection I/F 16 is an interface for communication with the main device 20 via the channel 30.

In order to receive user operations, the control panel 100 includes the touch panel 101 described above and the LCD 102 serving as a display section. The control panel 100 further includes a hard key(s) 103 including a pressure sensor that can detect a pressure applied by the operator or switching of a switch by the applied pressure, for example. Besides, for example, a light emitting diode (LED) lamp for supporting user operations may further be provided.

The control panel 100 further includes a proximity sensor 104 that senses an object in the proximity of the control panel 100. The proximity sensor 104 senses an object in the proximity of the proximity sensor 104 and may be a magnetic sensor, a capacitive sensor, a mechanical sensor, an infrared sensor, or the like as long as object in the proximity can be sensed.

The proximity sensor 104 provided at an appropriate position of the control panel 100 can sense an object in the proximity of the control panel 100. For example, the proximity sensor 104 can sense the operator's hand that is approaching to change the angle of the control panel 100. The position where the proximity sensor 104 is provided will be described later with reference to FIG. 8.

Next, a hardware configuration of the main device 20 will be described. As illustrated in FIG. 7, the main device 20 includes a CPU 21, a ROM 22, a RAM 23, a hard disk drive (HDD) 24, the communication I/F 25, a connection I/F 26, and an engine 27, which are connected to one another via a system bus 28.

The CPU 21 controls the operation of the main device 20. The CPU 21 executes a program stored in the ROM 22 or the HDD 24 by using the RAM 23 as a work area, and thereby controls the entire operation of the main device 20 and implements various functions such as the copier function, the scanner function, the fax function, and the printer function described above. Each time any of these functions is performed, the content of the function (hereinafter also referred to as a job) can be stored in the HDD 24 or the like as an operation log of the image forming apparatus 1000.

The communication I/F 25 is an interface for connecting to a network such as the Internet or a LAN.

The connection I/F 26 is an interface for communication with the operation device 10 via the channel 30.

The engine 27 is a hardware component that performs processes other than general information processing or communication, in order to implement the copier function, the scanner function, the fax function, and the printer function. For example, the engine 27 includes a plotter that performs printing on a recording medium such as a sheet. The plotter can employ, but not limited to, an electrophotography method, an inkjet method, or any other method by which printing on a sheet or the like is possible.

The main device 20 further includes the ADF 1, the scanner 2, the sheet ejection section 3, the housing 4, the sheet tray 5, and the like described above. Besides, the main device 20 can further include optional sections such as a fax section that performs fax communication and a finisher that sorts recording mediums that have been subjected to printing.

Hereinafter, all of the components of the operation device 10 illustrated in FIG. 7 may be accommodated in and covered with the exterior 7 of the control panel and the touch panel 101, or some of the components of the operation device 10 may be accommodated in and covered with the exterior 7 of the control panel and the touch panel 101.

Figure 8A:
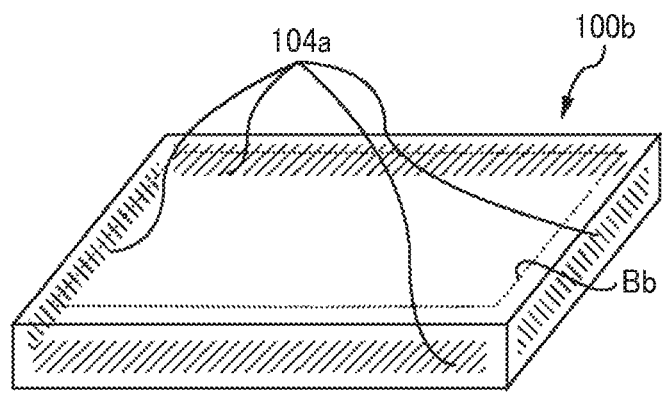
FIGS. 8A to 8C illustrate positions where a proximity sensor is provided in a control panel according to the first embodiment.
Figure 8B:
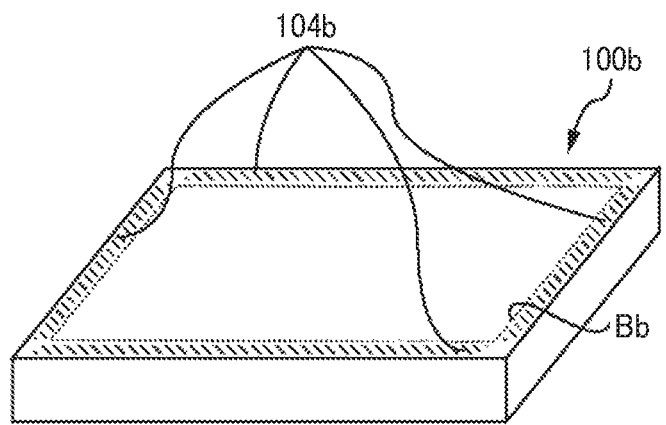
Figure 8C:
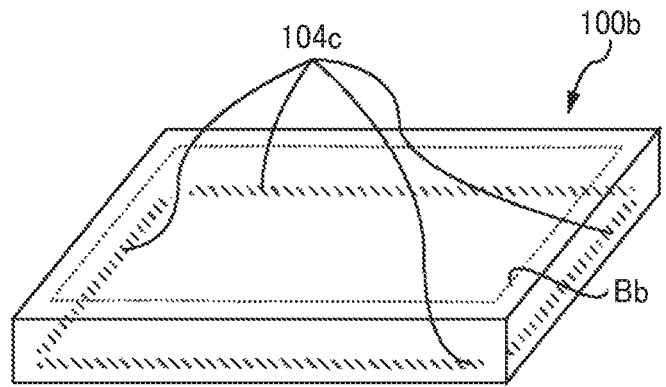

FIGS. 8A to 8C illustrate positions where the proximity sensor 104 is provided in the control panel 100b. In FIGS. 8A to 8C, a surface of the control panel 100b on which a dotted line is provided is the touch surface 1011b of the control panel 100b facing the operator. This surface is referred to as the front surface of the control panel 100b, and a surface facing away from the front surface of the control panel 100b is referred to as a back surface in FIGS. 8A to 8C.

FIG. 8A illustrates a case where the proximity sensors 104 are provided on four side surfaces of the control panel 100b, FIG. 8B illustrates a case where the proximity sensors 104 are provided on the front surface of the control panel 100b, and FIG. 8C illustrates a case where the proximity sensors 104 are provided on the back surface of the control panel 100b.

Although the proximity sensors 104 are provided on the side surfaces, the front surface, and the back surface of the control panel 100b in FIGS. 8A, 8B, and 8C, respectively, the proximity sensors 104 may also be provided on two or more of the side surfaces, the front surface, and the back surface, such as the side surfaces and the front surface, for example. In addition, although the proximity sensors 104 are each provided in a portion of a surface in each of the FIGS. 8A, 8B, and 8C, the proximity sensors 104 may be provided on the entire surface, leaving no room. Furthermore, although the proximity sensors 104 are provided on all of the four side surfaces in FIG. 8A, the proximity sensors 104 may be selectively provided on some of the side surfaces.

The proximity sensors 104 may be provided inside or outside the control panel 100b. In addition, the proximity sensors 104 may be fixed to the exterior 7, which is a part of the control panel 100b. Alternatively, a member for fixing the proximity sensors 104 may be additionally provided in the control panel 100b, and the proximity sensors 104 may be fixed to the member.

In the above manner, by providing the proximity sensors 104 that sense an object in the proximity of the control panel 100b selectively on at least a surface of the control panel 100b as appropriate, it is possible to reliably sense a touch of any operator on the control panel 100b, regardless of in what angle the operator is touching or how large the operator's hand is.

Figure 9:
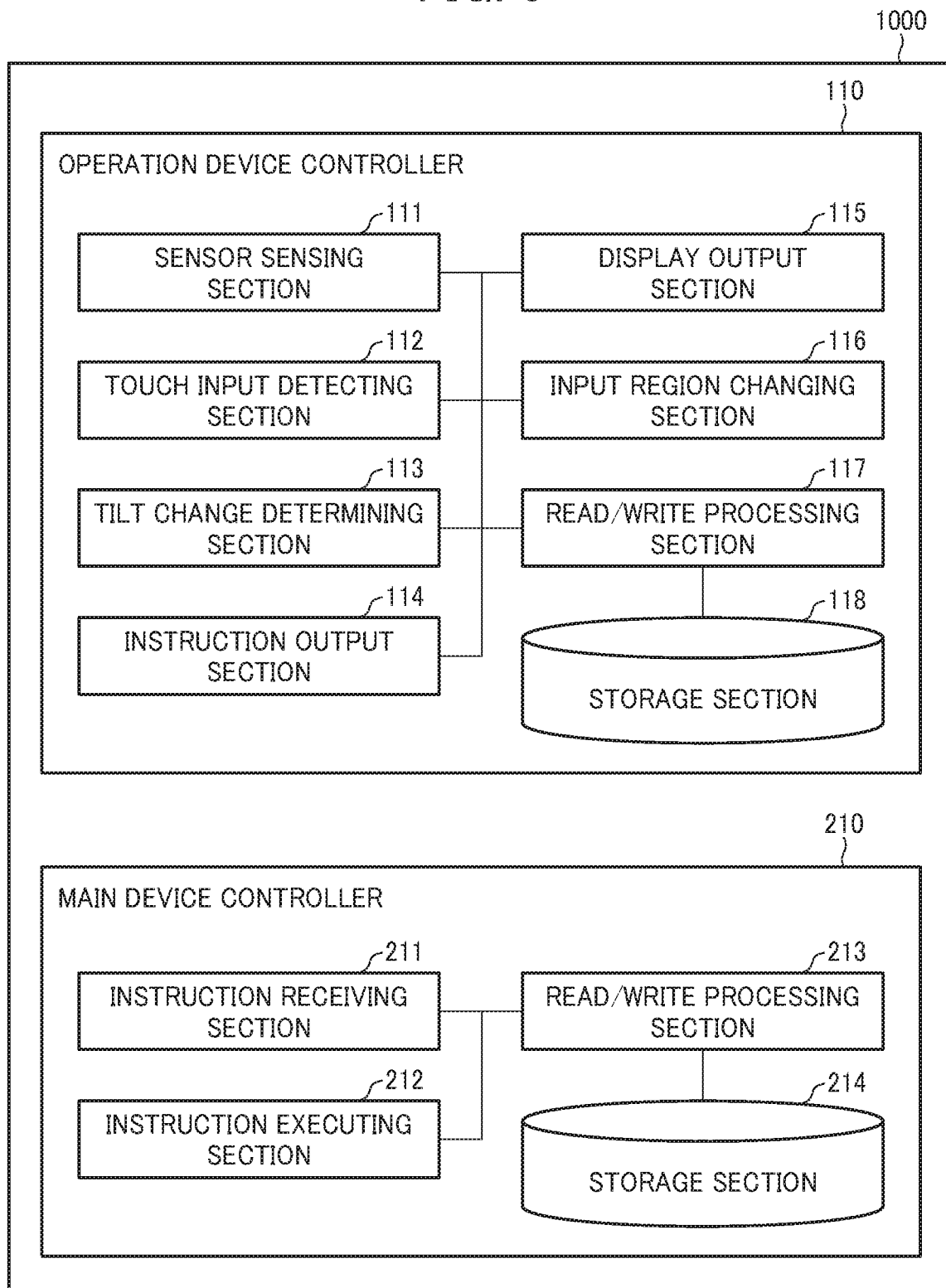
FIG. 9 is a functional block diagram of the image forming apparatus according to the first embodiment.

FIG. 9 is a functional block diagram of the image forming apparatus 1000. The image forming apparatus 1000 includes an operation device controller 110 and a main device controller 210. The operation device controller 110 generally controls the operation device 10, and the main device controller 210 generally controls the main device 20.

First, the operation device controller 110 will be described. The operation device controller 110 includes a sensor detecting section 111, a touch input detecting section 112, a tilt change determining section 113, an instruction output section 114, a display output section 115, an input region changing section 116, a read/write processing section 117, and a storage section 118.

The sensor detecting section 111 is realized by the CPU 11 executing a program stored in the ROM 12 or the flash memory 14 using the RAM 13 as a work area. The sensor detecting section 111 receives a detection signal from various sensors regarding the control panel 100, the sensors being provided in the image forming apparatus 1000, and outputs the detection signal as a detection result. For example, various sensors include, but are not limited to, the proximity sensor 104 and may be a tilt sensor of the control panel 100, a pressure sensor of the hard key(s) 103, a temperature sensor, a sound sensor, an ambient brightness sensor, and the like. Note that the touch input detecting section 112 described above receives a detection signal from the touch surface 1011, which is a touch sensor, and outputs the detection signal as a detection result. In a case where other touch sensors are provided, the sensor detecting section 111 may perform detection.

The touch input detecting section 112 is realized by the CPU 11 executing a program stored in the ROM 12 or the flash memory 14 using the RAM 13 as a work area. The touch input detecting section 112 receives a detection signal from the touch surface 1011, which is a touch sensor, and outputs the detection signal as a detection result.

The tilt change determining section 113 is realized by the CPU 11 executing a program stored in the ROM 12 or the flash memory 14 using the RAM 13 as a work area. The tilt change determining section 113 determines whether the tilt of the control panel 100 relative to the main device 20 has been changed.

The instruction output section 114 is realized by the CPU 11 executing a program stored in the ROM 12 or the flash memory 14 using the RAM 13 as a work area. On the basis of the detection result received by the sensor detecting section 111 or the detection result received by the touch input detecting section 112, the instruction output section 114 outputs an execution instruction to the main device 20.

If the tilt change determining section 113 determines that the tilt has been changed, the instruction output section 114 does not output an execution instruction of at least the detection result from the touch input detecting section 112. The absence of the output is, in other words, invalidation of soft key inputs.

The display output section 115 is realized by the CPU 11 executing a program stored in the ROM 12 or the flash memory 14 using the RAM 13 as a work area. The display output section 115 outputs a display content to the LCD 102 serving as a display section.

The input region changing section 116 is realized by the CPU 11 executing a program stored in the ROM 12 or the flash memory 14 using the RAM 13 as a work area. The input region changing section 116 changes an input region that is a region of the touch surface 1011 in which a touch input can be made.

The read/write processing section 117 is realized by the CPU 11 executing a program stored in the ROM 12 or the flash memory 14 using the RAM 13 as a work area. The read/write processing section 117 has functions of causing various types of data to be stored in the storage section 118 and of reading the stored various types of data.

The storage section 118 is realized by processing of the ROM 12 or the flash memory 14 and executes a function of storing programs, document data, and various types of setting information for the operation of the operation device 10. Temporary storage of the storage section 118 may be realized by processing of the RAM 13.

Next, the main device controller 210 will be described. The main device controller 210 includes an instruction receiving section 211, an instruction executing section 212, a read/write processing section 213, and a storage section 214.

The instruction receiving section 211 is realized by the CPU 21 executing a program stored in the ROM 22 or the HDD 24 using the RAM 23 as a work area. The instruction receiving section 211 receives an instruction from the instruction output section 114 and issues an execution instruction for each component of the main device 20.

The instruction executing section 212 executes an instruction from the instruction output section 114. For example, the instruction executing section 212 may cause, but not limited to, the engine 27 to execute the copier function or the CPU 21 to execute an instruction.

The read/write processing section 213 is realized by the CPU 21 executing a program stored in the ROM 22 or the HDD 24 using the RAM 23 as a work area. The read/write processing section 213 executes a function of causing various types of data to be stored in the storage section 214 or of reading the stored various types of data.

The storage section 214 is realized by processing of the ROM 22 or the HDD 24 and executes a function of storing programs, document data, various types of setting information for the operation of the image forming apparatus 1000, the operation log of the image forming apparatus 1000, and the like. Temporary storage of the storage section 214 may be realized by processing of the RAM 23.

Note that the main device controller 210 may be referred to as first controller, and the operation device controller 110 may be referred to as second controller, for example, to distinguish one from the other.

Figure 10:
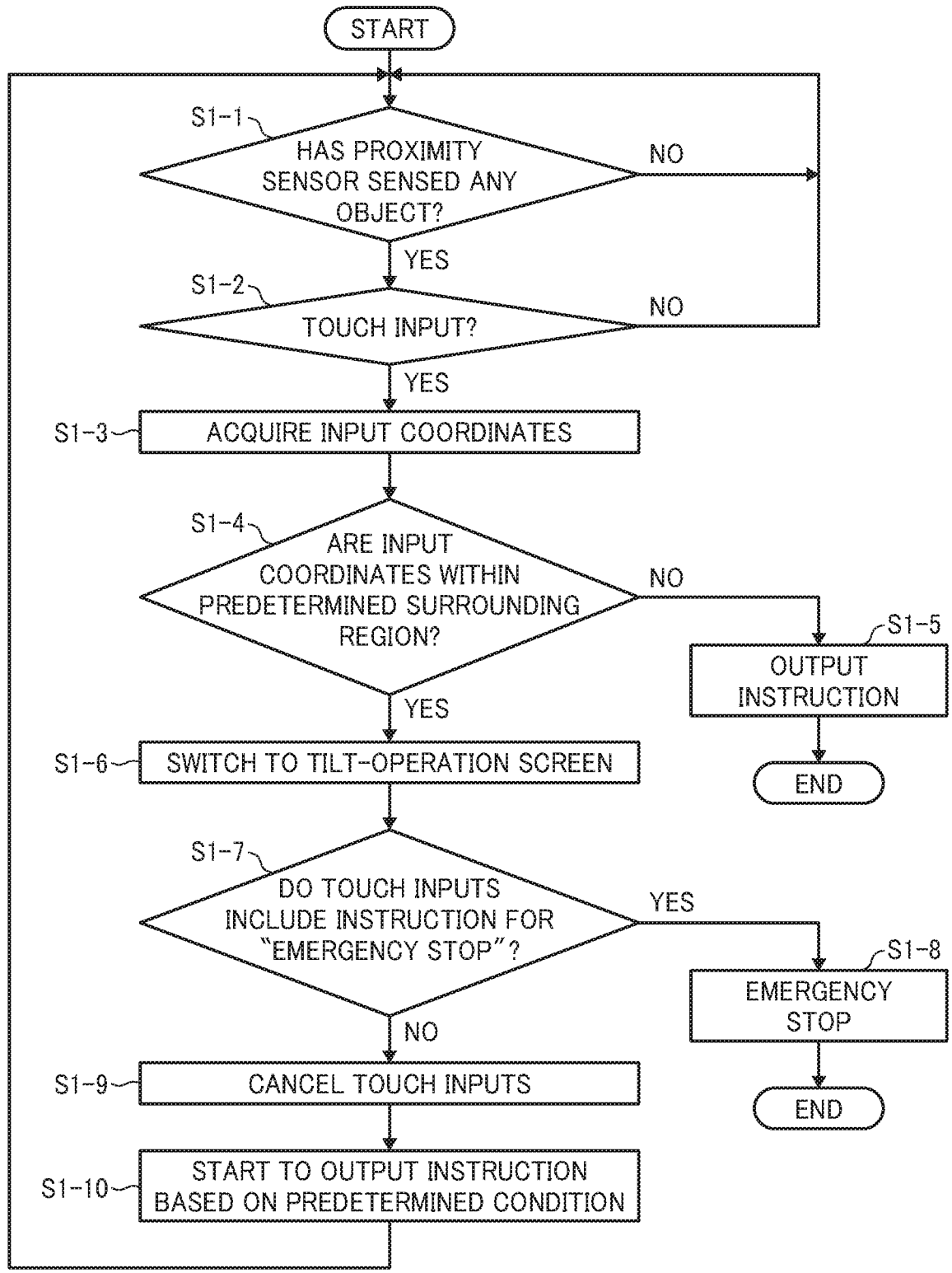
FIG. 10 is a flowchart illustrating a first example of an erroneous operation preventing process according to the first embodiment.

FIG. 10 is a flowchart illustrating a first erroneous operation preventing process.

The tilt change determining section 113 determines whether the sensor detecting section 111 has detected any object in the proximity of the control panel 100 (S1-1). If the sensor detecting section 111 has detected any object, the tilt change determining section 113 determines whether the touch input detecting section 112 has detected a touch input on the touch surface 1011 (S1-2). If the touch input detecting section 112 has detected a touch input, the tilt change determining section 113 acquires input coordinates on the touch surface 1011 (S1-3). The input coordinates are information indicating a position of the touch input. On the basis of the input coordinates, the tilt change determining section 113 determines whether the position of the touch input on the touch surface 1011 is within a surrounding region in the input region of the touch surface 1011 (S1-4).

Now, the surrounding region will be described with reference to FIG. 11 and FIG. 12.

Figure 11:
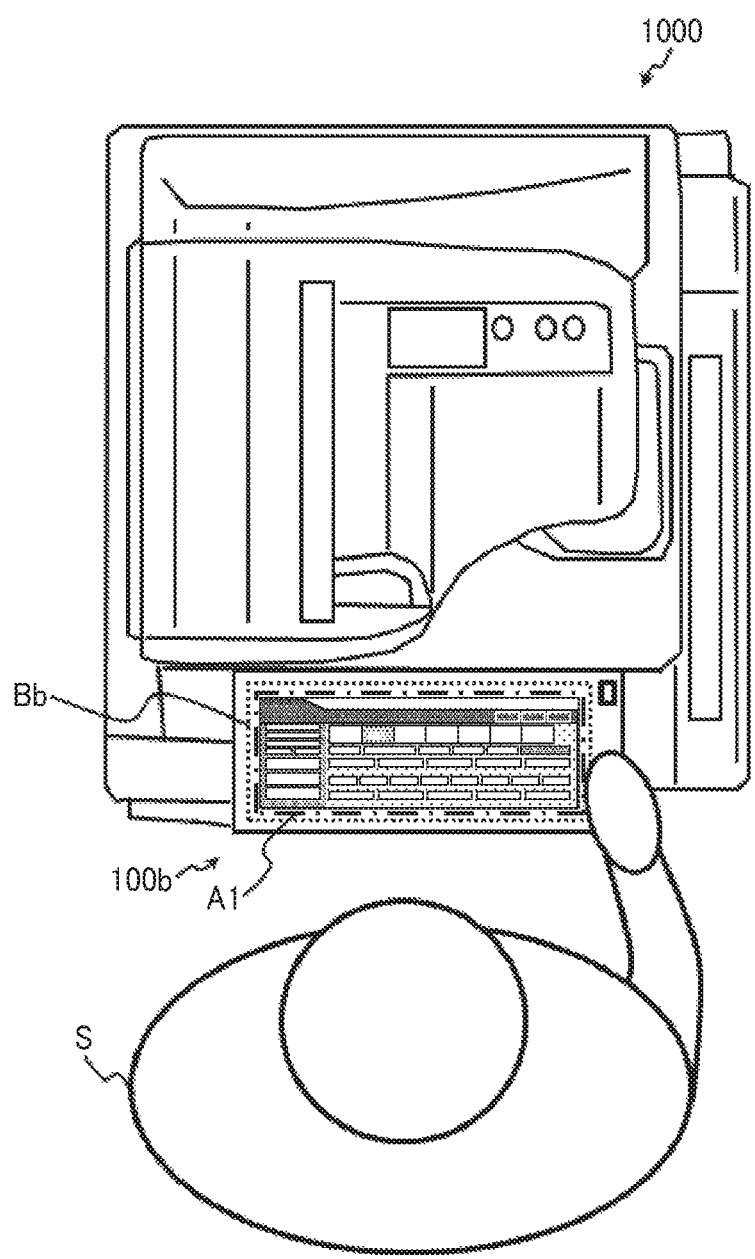
FIG. 11 illustrates the operator and the image forming apparatus when viewed from above according to the first embodiment.

First, FIG. 11 illustrates a situation in which the operator S standing in front of the image forming apparatus 1000 performs a user operation, when viewed from above the image forming apparatus 1000.

An inner region of a chain line within the boundary Bb is an input region A1 of the touch surface 1011b. In the input region A1, images of soft keys displayed by the LCD 102 serving as a display section are displayed. Seeing the images of soft keys, the operator S makes a touch input on the touch surface 1011b.

Figure 12:
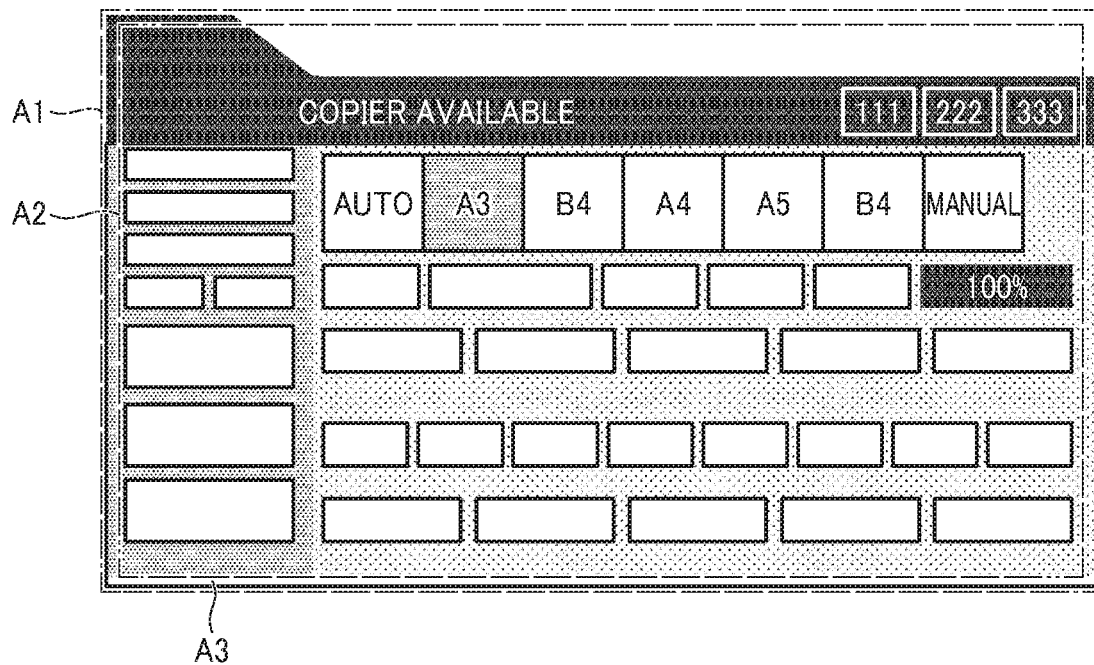
FIG. 12 illustrates a surrounding region according to the first embodiment.

FIG. 12 illustrates the input region A1 illustrated in FIG. 11. In particular, since the control panel 100b is flat without a step at the boundary Bb, if the operator S holds the exterior 7 to change the tilt of the control panel 100b, the operator S may erroneously press a surrounding part in the input region A1. The surrounding part is illustrated as a region A3 that is a region between the input region A1 defined by a chain line and an input region A2 similarly illustrated by a two-dot chain line in FIG. 12 and is hereinafter referred to as the surrounding region.

Note that the surrounding region is present, for example, but not limited to, in the four vertical and lateral sides of the input region A1 having a rectangular shape. The surrounding region may be present at any part of the region A3 in FIG. 12. For example, if the operator S often erroneously holds a left or right region of the control panel 100b seen from the operator S, the left or right part of the surrounding part may be the surrounding region.

The surrounding region A3 is within the normal input region A1 and is used for normal inputs. In a case where the proximity sensor 104 has sensed an object in the proximity of the control panel 100b, a hand of the operator S or the like is in the proximity of the control panel 100b, and a touch on the surrounding region A3 is likely to be an erroneous touch.

Thus, with the sensing of the proximity sensor 104 and the touch in the surrounding region A3, it can be determined that an operation of changing the tilt is being performed.

Referring back to FIG. 10, if the tilt change determining section 113 determines in step S1-4 that the touch input is not within the surrounding region, the tilt change determining section 113 determines that the tilt has not been changed.

Although the proximity sensor 104 has sensed the operator S or the like in the proximity, since the touch input is not within the surrounding region, it can be determined that the operator S is not performing the operation of changing the tilt by holding the control panel 100.

Subsequently, in accordance with the above-described touch input and the subsequent touch input, the instruction output section 114 outputs an instruction to the instruction receiving section 211 (S1-5), and the flow ends.

On the other hand, if it is determined in step S1-4 that the touch input is within the surrounding region, the tilt change determining section 113 determines that the tilt is being changed.

Since the operator S or the like is in the proximity and is touching the surrounding region, the tilt change determining section 113 can determine that the operator S is performing the operation of changing the tilt by holding the control panel 100.

Figure 13:
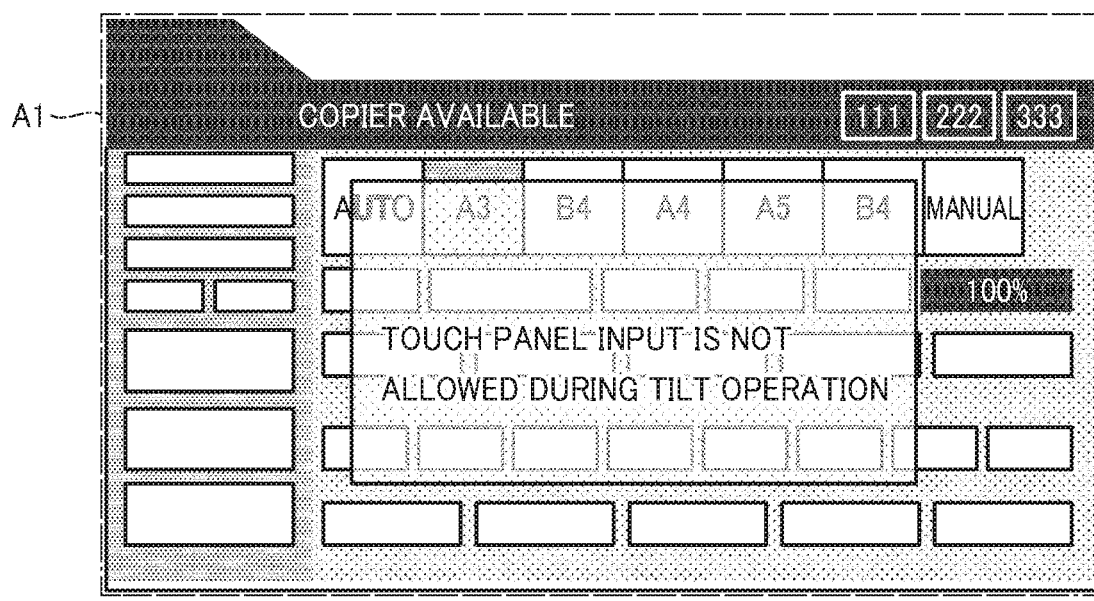
FIG. 13 illustrates an example of a display screen for the operator according to the first embodiment.

Subsequently, as a display content for the operator S, the display output section 115 outputs a message indicating that any input is invalid while the tilt is being changed, for example, "TOUCH PANEL INPUT IS NOT ALLOWED DURING TILT OPERATION" as illustrated in FIG. 13, thereby switching the screen of the control panel 100 (S1-6).

Subsequently, the instruction output section 114 determines whether touch inputs include an input for emergency stop (S1-7). If touch inputs include an input for emergency stop, the instruction output section 114 makes an emergency stop (S1-8), and the flow ends. If there is no input for emergency stop, touch inputs that has been given so far and subsequent touch inputs other than the emergency stop are canceled (S1-9).

Subsequently, the instruction output section 114 may start to output an instruction without canceling the touch inputs if a predetermined condition is satisfied (S1-10). The predetermined condition is, for example, a case where the tilt change determining section 113 determines that the tilt has not been changed, a case where the proximity sensor 104 senses no object in the proximity, or a case where a predetermined time has elapsed from the determination of the tilt change determining section 113. The predetermined condition may also be a case where a predetermined hard key has been pressed in order to validate touch panel inputs or may be any other case.

Figure 14:
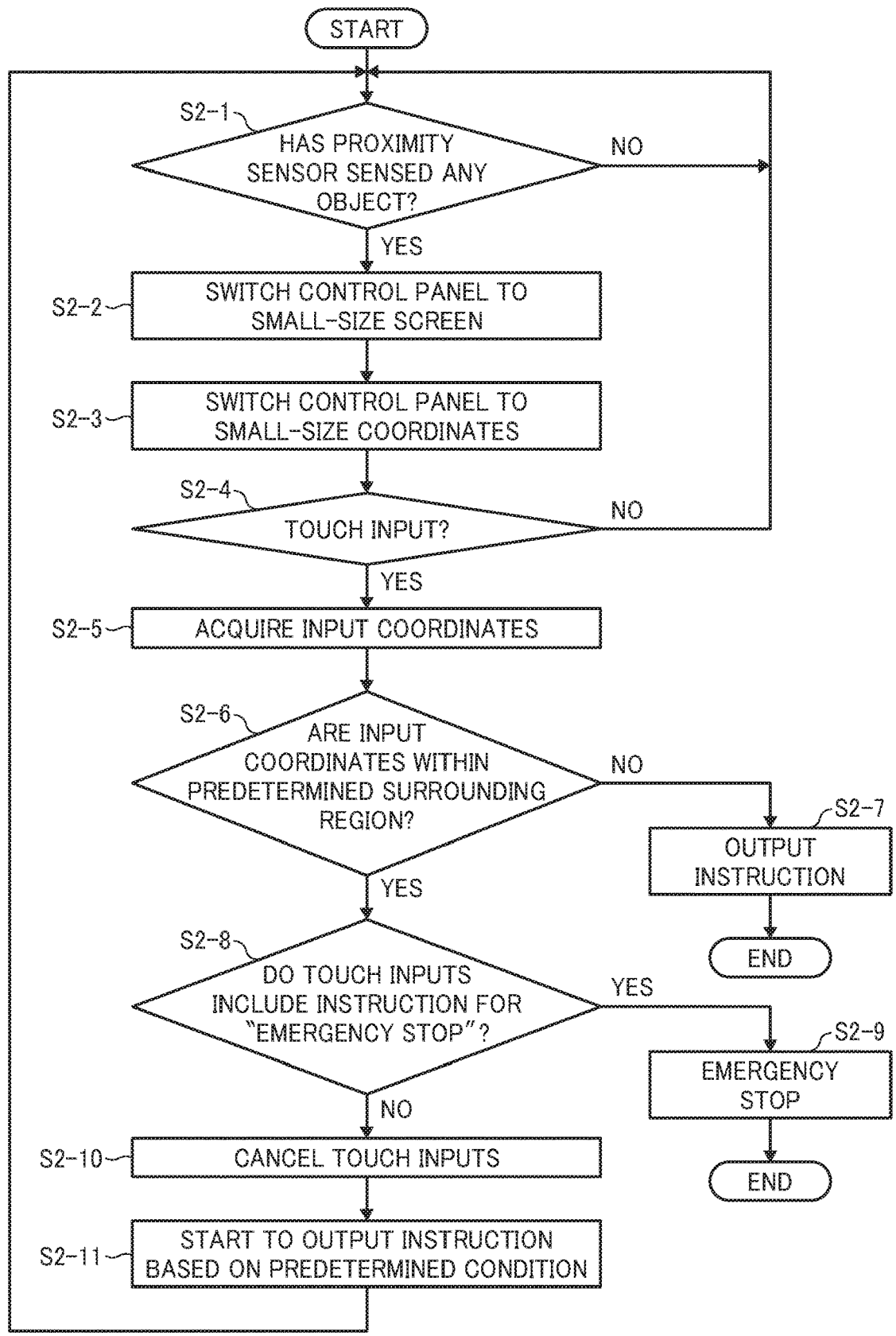
FIG. 14 is a flowchart illustrating a second example of the erroneous operation preventing process according to the first embodiment.

FIG. 14 is a flowchart illustrating a second erroneous operation preventing process.

The tilt change determining section 113 determines whether the sensor detecting section 111 has detected any object in the proximity of the control panel 100 (S2-1). If the sensor detecting section 111 has detected any object, the display output section 115 switches a display content of the control panel 100 for the operator S to a small-size screen, which is a screen for small-size input (S2-2). Subsequently, the touch input detecting section 112 switches the input coordinates to small-size input coordinates, which are input coordinates for small-size input (S2-3).

Now, the small-size input will be described with reference to FIG. 15.

Figure 15:
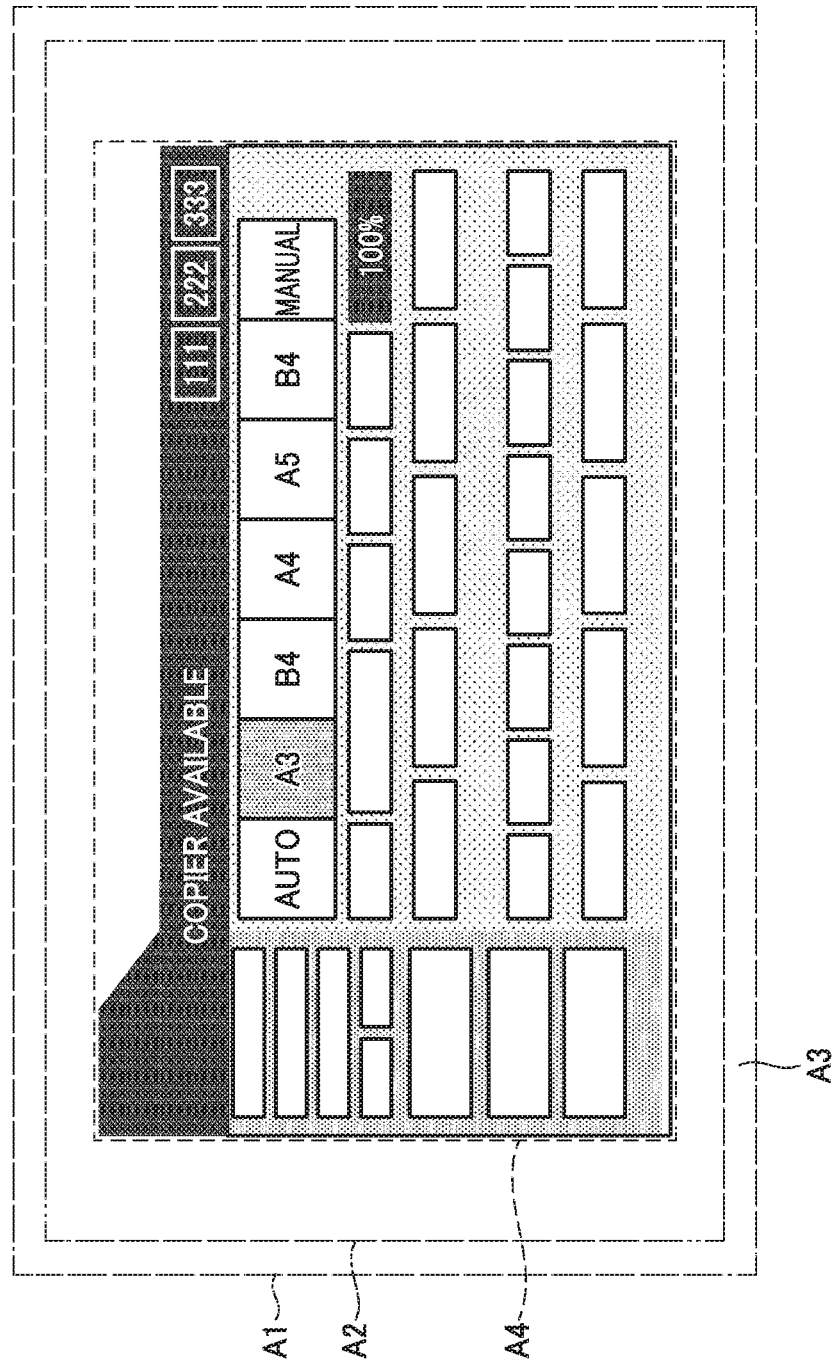
FIG. 15 illustrates a small-size screen according to the first embodiment.

FIG. 15 illustrates a region in the input region A1. An input region A4 defined by a dashed line is an input region for small-size input. A screen of soft keys and the like is displayed in a region smaller than the input region A1, and input coordinates are changed accordingly.

By setting such a small size, an inner region away from the surrounding region A3 of the control panel 100 is set as the input region. Thus, it is less likely that the operator S who wishes to perform normal soft key inputs erroneously touches the surrounding region A3, resulting in invalidation of the soft keys.

Referring back to FIG. 14, after the small-size screen has been displayed in step S2-2 and S2-3, the tilt change determining section 113 determines whether the touch input detecting section 112 has detected a touch input on the touch surface 1011 (S2-4). If the touch input detecting section 112 has detected a touch input, the tilt change determining section 113 acquires input coordinates of the touch surface 1011 (S2-5). The input coordinates are information indicating the position of the touch input.

On the basis of the input coordinates, the tilt change determining section 113 determines whether the position of the touch input on the touch surface 1011 is within the surrounding region A3 in the input regions of the touch surface 1011 (S2-6).

If the position of the touch input is not within the surrounding region A3 as a result of the determination in step S2-6, in accordance with the above-described touch input and the subsequent touch input, the instruction output section 114 outputs an instruction to the instruction receiving section 211 (S2-7), and the flow ends.

If the position of the touch input is within the surrounding region A3 as a result of the determination in step S2-6, the instruction output section 114 determines whether touch inputs include an input for emergency stop (S2-8). If touch inputs include an input for emergency stop, the instruction output section 114 makes an emergency stop (S2-9), and the flow ends. If there is no input for emergency stop, touch inputs that has been given so far and the subsequent touch inputs other than the emergency stop are canceled (S2-10).

Subsequently, the instruction output section 114 may start to output an instruction without canceling the touch inputs if a predetermined condition is satisfied (S2-11).

In the above manner, in the second erroneous operation preventing process, prior to determination as to whether or not an input in the surrounding region A3 is given, the size of the input region is reduced, that is, the input region is moved away from the surrounding region A3. Thus, it is less likely that the operator S who wishes to perform normal soft key inputs erroneously touches the surrounding region A3, and that the result of the erroneous touch is determined as a tilt change so as to invalidate the soft keys. Note that, before switching to the small-size coordinates, which are input coordinates for small-size input, if inputs to the outside region thereof are invalidated, it is possible to give inputs while holding the control panel 100 and performing the tilt operation. It is unnecessary to determine whether an erroneous operation is performed thereafter.

Figure 16:
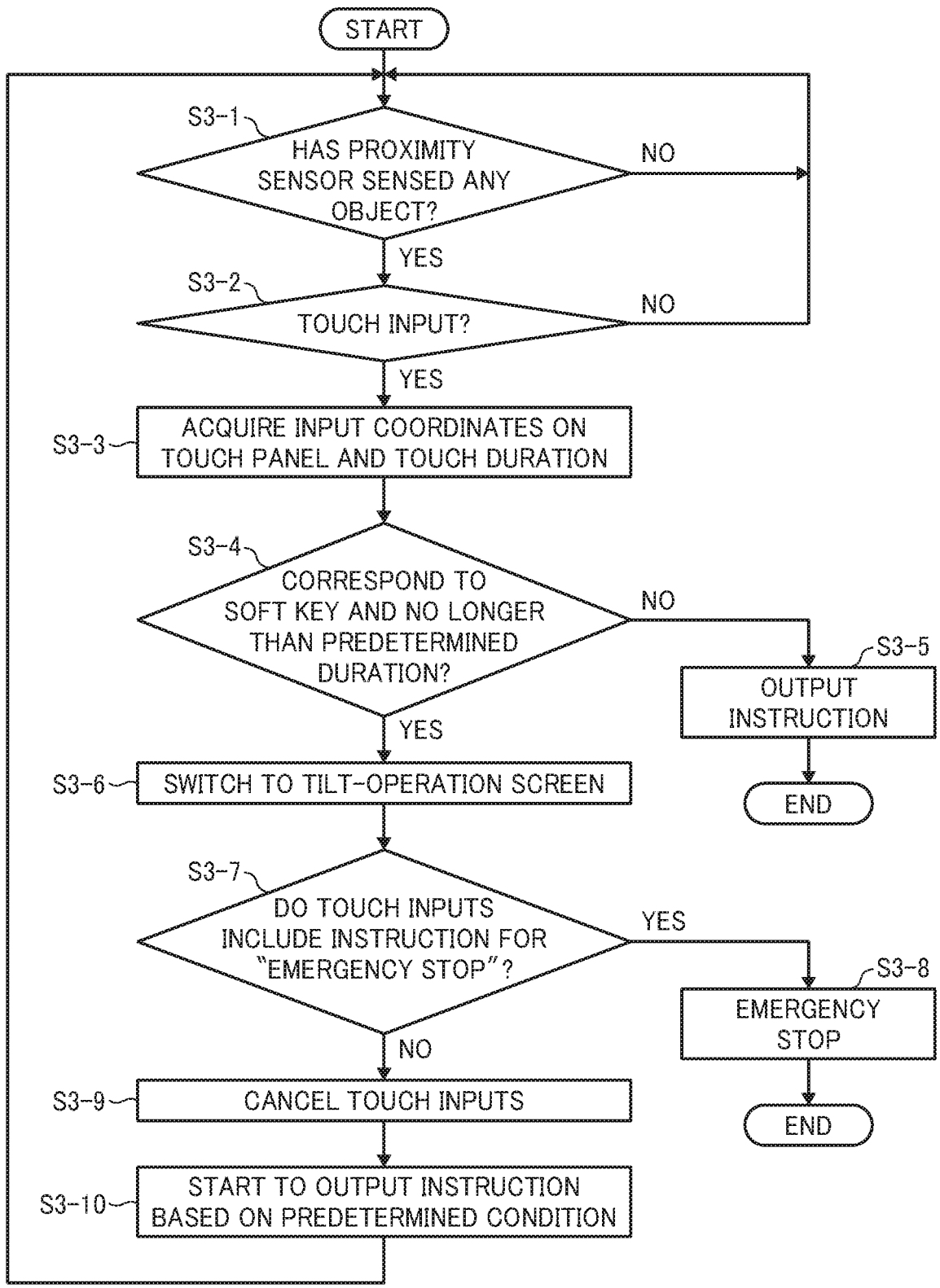
FIG. 16 is a flowchart illustrating a third example of the erroneous operation preventing process according to the first embodiment.

FIG. 16 is a flowchart illustrating a third erroneous operation preventing process.

The tilt change determining section 113 determines whether the sensor detecting section 111 has detected any object in the proximity of the control panel 100 (S3-1). If the sensor detecting section 111 has detected any object, the tilt change determining section 113 determines whether the touch input detecting section 112 has detected a touch input on the touch surface 1011 (S3-2). If the touch input detecting section 112 has detected a touch input, the tilt change determining section 113 acquires input coordinates on the touch surface 1011 and a touch duration of the touch input (S3-3). The input coordinates are information indicating a position of the touch input. On the basis of the input coordinates and the touch duration, the tilt change determining section 113 determines whether the position of the touch input corresponds to a soft key and whether the touch duration is no longer than a predetermined duration (S3-4).

If the condition in step S3-4 is satisfied, the tilt change determining section 113 determines that the tilt has not been changed.

In order to change the tilt, the control panel 100 is pressed for a long time compared with soft key inputs. Thus, if, for example, there is a touch at a position corresponding to a soft key and its duration is substantially equal to an average touch duration of soft key inputs, even if the proximity sensor 104 has sensed the operator S or the like in the proximity, the tilt change determining section 113 can determine that the operator S is not performing the operation of changing the tilt by holding the control panel 100.

The subsequent steps S3-5 to S3-10 are the same as the steps S1-5 to S1-10 described above, respectively, and are not repeatedly described.

Figure 17:
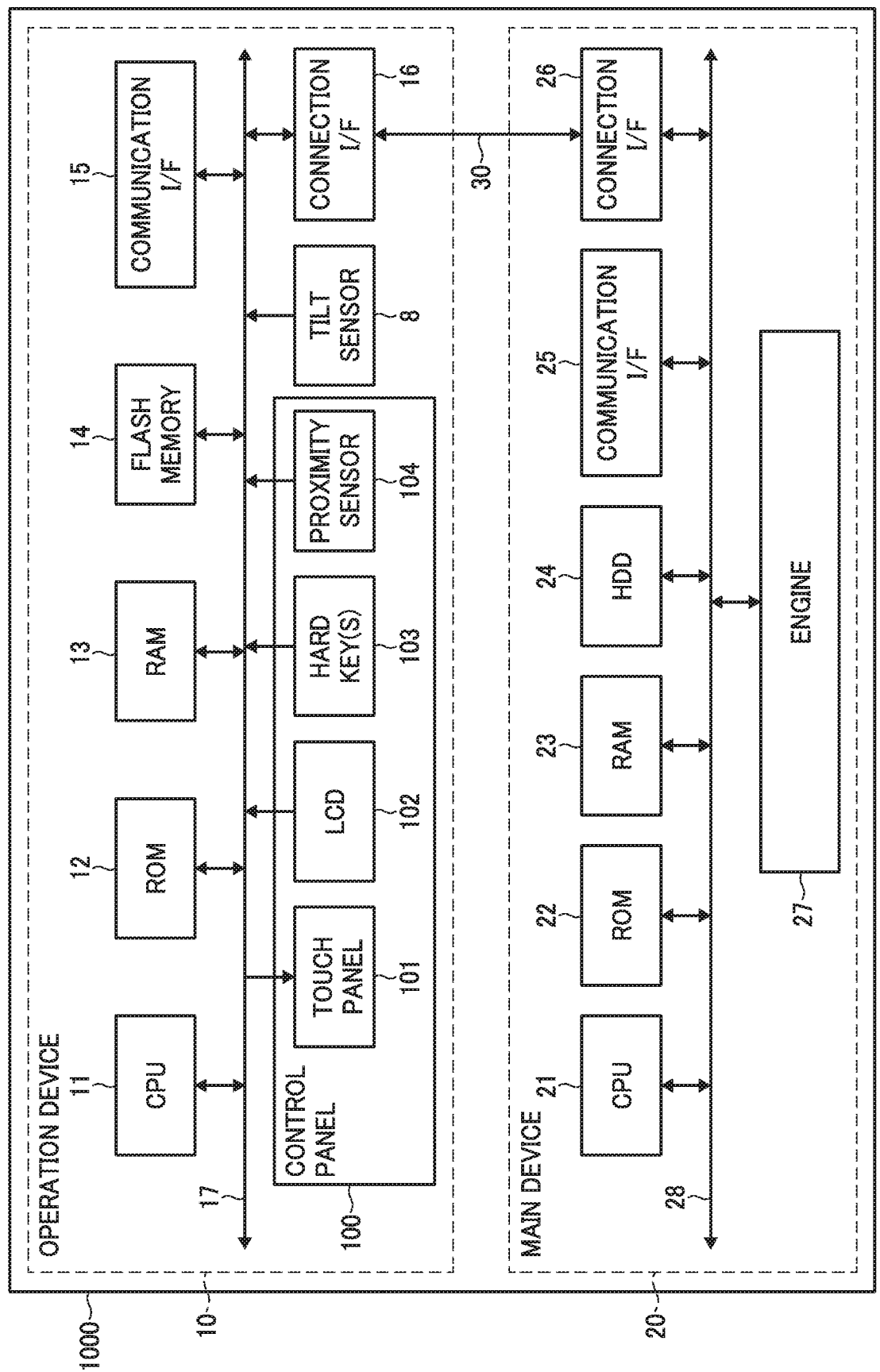
FIG. 17 illustrates a hardware configuration of the image forming apparatus according to a second embodiment.

FIG. 17 illustrates a hardware configuration of the image forming apparatus 1000 according to a second embodiment. The operation device 10 illustrated in FIG. 17 includes a tilt sensor 8 that is a sensor for sensing the tilt of the control panel 100 relative to the main device 20. The tilt sensor 8 is mutually connected to the other components of the control panel 100 via the system bus 17. The components other than the tilt sensor 8 in FIG. 17 are the same as those in FIG. 7 and are not repeatedly described.

Figure 18:
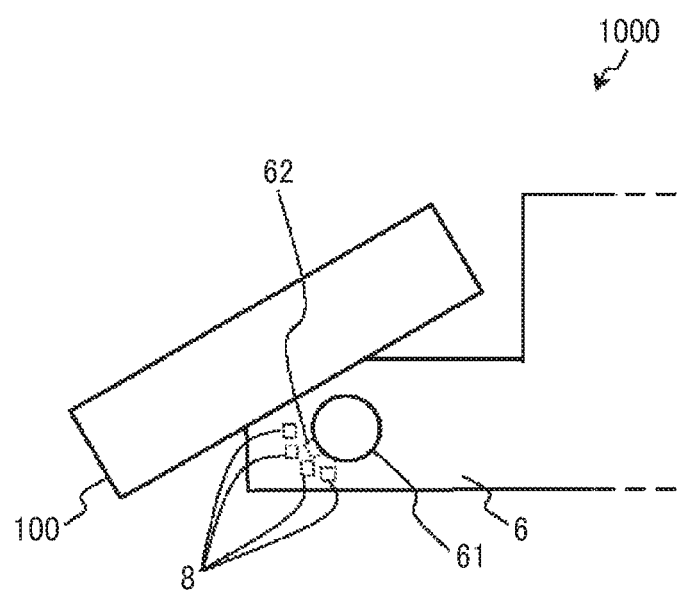
FIG. 18 illustrates a structure of a tilt sensor according to the second embodiment.

FIG. 18 illustrates a structure of the tilt sensor 8.

As illustrated in FIG. 18, in the tilt changing section 6, a protrusion 62 is provided at a part of the shaft section 61. The protrusion 62 rotates along with the rotation of the shaft section 61. In addition, the tilt sensor 8 including a plurality of sensing sections is provided at a part of the main device 20, the part not moving along with the tilt change of the control panel 100. Any sensor may be used as each of the sensing sections as long as an object approaching or passing over the protrusion 62 can be sensed.

The plurality of sensing sections are arranged so as to conform to the rotation along the shaft section 61. For example, the plurality of sensing sections are arranged in a form of steps surrounding the shaft.

Note that the protrusion 62 and the tilt sensor 8 are both provided inside and are not seen from outside, and thus are illustrated by a dotted line in FIG. 18. In addition, lead lines from the plurality of sensing sections of the tilt sensor 8 are illustrated for description.

If the position of the protrusion 62 is changed along with the rotation of the shaft section 61, depending on which of the sensing sections in the form of steps has output a detection signal, the angle of the control panel 100 relative to the main device 20 at that time point is sensed. Thus, if the sensed angle is changed, the tilt change determining section 113 can determine that the tile changing operation is being performed.

FIG. 19 is a flowchart illustrating a fourth erroneous operation preventing process.

The tilt change determining section 113 determines whether the sensor detecting section 111 has detected any object in the proximity of the control panel 100 (S4-1). If the sensor detecting section 111 has detected any object, the tilt change determining section 113 determines whether the tilt sensor 8 has sensed a change in the tilt of the control panel 100 (S4-2).

If the tilt change determining section 113 determines that the tilt is being changed in step S4-2, the process proceeds to step S4-3.

The subsequent steps S4-3 to S4-7 are the same as steps S1-6 to S1-10 described above, respectively, and are not repeatedly described.

According to the above embodiments, the operator can be prevented from performing an erroneous operation when changing the tilt of the control panel relative to the main device by holding the control panel.

The embodiments of the present invention have been described above in detail. However, the present invention is not limited to the specific embodiments. Various modifications and changes can be made without departing from the spirit of the present invention described in the claims.

For example, although the image forming apparatus has been illustrated as an example of the present invention, the present invention is also applicable to other information processing apparatuses in which instructions can be input to a main device by using a touch panel, such as a general personal computer (PC) or a mobile information terminal.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image formation apparatus comprising:
a control panel configured to receive an input of an operator;
a main device configured to execute an operation instruction corresponding to the input; and
a tilt changing section configured to change a tilt of the control panel relative to the main device in response to a movement of the control panel by the operator holding at least a part of the control panel,
wherein the control panel includes
a touch panel having a touch surface that is to be touched for the input,
a control panel housing covering the touch panel except for at least a part of the touch surface,
a proximity sensor configured to sense an object in the proximity of the control panel, and
circuitry, and
wherein the circuitry
determines a presence or an absence of an operation of the tilt changing section by the operator based on a result of the sensing of the object by the proximity sensor,
outputs an operation instruction to the main device based on a touch input that is the input given by a touch on the touch surface, and
refrains from outputting the operation instruction based on a determination that the tilt is changed, and wherein the control panel further includes a display section configured to display, for the operator, a display content that has been output from the circuitry, wherein, after the sensing of the object in the proximity by the proximity sensor, before determination as to whether the tilt is changed, the circuitry reduces a size of an input region in which the touch input is to be received, and wherein the circuitry outputs the operation instruction such that a size of a region in which the display content is to be displayed is reduced.

2. The image formation apparatus according to claim 1, wherein the control panel housing has a first surface on a plane that is substantially the same as the touch surface.

3. The image formation apparatus according to claim 1, wherein the proximity sensor is provided on any of a surface of the control panel on which the touch surface is provided, a surface of the control panel facing away from the touch surface, and a side surface of the control panel on which the touch surface is not provided.

4. The image formation apparatus according to claim 1, wherein the control panel further includes a display section configured to display, for the operator, a display content that has been output from the circuitry, and wherein, when the circuitry determines that the tilt is changed, the display section outputs, as the display content, invalidity of an operation on the control panel.

5. The image formation apparatus according to claim 1, wherein, when a touch is sensed in a surrounding region that is a surrounding part in an input region in which the touch input is to be received, the circuitry determines that the tilt is changed.

6. The image formation apparatus according to claim 1, further comprising a tilt sensor configured to sense the tilt of the control panel relative to the main device, wherein, when the proximity sensor has sensed the object in the proximity and then the tilt sensor has sensed a change in the tilt, the circuitry determines that the tilt is changed.

7. The image formation apparatus according to claim 6, wherein the tilt changing section is located between the main device and the control panel, the tilt changing section including:

a shaft section configured to extend in parallel to the touch surface of the control panel and to rotate along with the control panel, functioning as a rotation axis of the control panel; and a protrusion, in the shaft section, configured to rotate along with the rotation of the shaft section, wherein the tilt sensor does not move along with the control panel and detect a position of the protrusion as the tilt.

8. The image formation apparatus according to claim 1, wherein, when the circuitry determines that the tilt is changed, the circuitry outputs the operation instruction for emergency stop to the main device and refrains from outputting other operation instructions.

9. The image formation apparatus according to claim 8, wherein, when a predetermined condition is satisfied in a state where the operation instruction is not output, the circuitry starts to output the operation instruction again.

10. The image formation apparatus according to claim 9, wherein the predetermined condition is a predetermined time elapsed from when the circuitry determines that the tilt is changed.

11. The image formation apparatus according to claim 9, wherein the predetermined condition is an absence of the sensing of the object in the proximity by the proximity sensor.

12. An image formation apparatus comprising:

a control panel configured to receive an input of an operator;

a main device configured to execute an operation instruction corresponding to the input; and a tilt changing section configured to change a tilt of the control panel relative to the main device in response to a movement of the control panel by the operator holding at least a part of the control panel, wherein the control panel includes a touch panel having a touch surface that is to be touched for the input, a control panel housing covering the touch panel except for at least a part of the touch surface, a proximity sensor configured to sense an object in the proximity of the control panel, and circuitry, and wherein the circuitry determines a presence or an absence of an operation of the tilt changing section by the operator based on a result of the sensing of the object by the proximity sensor, outputs an operation instruction to the main device based on a touch input that is the input given by a touch on the touch surface, and refrains from outputting the operation instruction based on a determination that the tilt is changed, and wherein, when the proximity sensor has sensed the object in the proximity, and a touch duration for the touch input is longer than a predetermined duration, the circuitry determines that the tilt is changed.

13. The image formation apparatus according to claim 12, wherein the control panel housing has a first surface on a plane that is substantially the same as the touch surface.

14. The image formation apparatus according to claim 12, wherein the proximity sensor is provided on any of a surface of the control panel on which the touch surface is provided, a surface of the control panel facing away from the touch surface, and a side surface of the control panel on which the touch surface is not provided.

15. The image formation apparatus according to claim 12, wherein the control panel further includes a display section configured to display, for the operator, a display content that has been output from the circuitry, and wherein, when the circuitry determines that the tilt is changed, the display section outputs, as the display content, invalidity of an operation on the control panel.

16. The image formation apparatus according to claim 12, wherein, when a touch is sensed in a surrounding region that is a surrounding part in an input region in which the touch input is to be received, the circuitry determines that the tilt is changed.

17. The image formation apparatus according to claim 12, further comprising a tilt sensor configured to sense the tilt of the control panel relative to the main device, wherein, when the proximity sensor has sensed the object in the proximity and then the tilt sensor has sensed a change in the tilt, the circuitry determines that the tilt is changed.

18. The image formation apparatus according to claim 17, wherein the tilt changing section is located between the main device and the control panel, the tilt changing section including:

a shaft section configured to extend in parallel to the touch surface of the control panel and to rotate along with the control panel, functioning as a rotation axis of the control panel; and a protrusion, in the shaft section, configured to rotate along with the rotation of the shaft section, wherein the tilt sensor does not move along with the control panel and detect a position of the protrusion as the tilt.

19. The image formation apparatus according to claim 12, wherein, when the circuitry determines that the tilt is changed, the circuitry outputs the operation instruction for emergency stop to the main device and refrains from outputting other operation instructions.

20. The image formation apparatus according to claim 19, wherein, when a predetermined condition is satisfied in a state where the operation instruction is not output, the circuitry starts to output the operation instruction again.

* * * * *